United States Patent [19]

Talley

[11] Patent Number: 5,771,976
[45] Date of Patent: Jun. 30, 1998

[54] ENHANCED PRODUCTION RATE WATER WELL SYSTEM

[76] Inventor: Robert R. Talley, 1806 Crutch Field, Katy, Tex. 77449

[21] Appl. No.: 666,014

[22] Filed: Jun. 19, 1996

[51] Int. Cl.⁶ .................................................. E21B 43/00
[52] U.S. Cl. .............................. 166/370; 166/50; 175/61; 175/62; 405/50; 405/258
[58] Field of Search .................................. 166/369, 370, 166/50; 175/61, 62; 405/50, 258

[56] References Cited

U.S. PATENT DOCUMENTS

| | | | |
|---|---|---|---|
| 5,059,064 | 10/1991 | Justice | 405/43 X |
| 5,101,906 | 4/1992 | Carlin et al. | 166/380 |
| 5,107,927 | 4/1992 | Whiteley et al. | 166/50 |
| 5,205,365 | 4/1993 | Quintana | 175/97 |
| 5,252,226 | 10/1993 | Justice | 405/128 X |
| 5,289,888 | 3/1994 | Talley | 175/61 |
| 5,343,965 | 9/1994 | Talley et al. | 175/62 |
| 5,396,950 | 3/1995 | Talley et al. | 166/50 |

*Primary Examiner*—Roger J. Schoeppel
*Attorney, Agent, or Firm*—Bush, Riddle & Jackson

[57] ABSTRACT

A high production rate water well system combines a horizontal production liner in the aquifer with an existing vertical well or pump that extends down thereto, with one end portion of the liner passing a distance from the vertical well that does not exceed about 5% of the drainage radius of the later. High flow rate recharge also can be accomplished by the same system.

5 Claims, 1 Drawing Sheet

5,771,976

ENHANCED PRODUCTION RATE WATER WELL SYSTEM

FIELD OF THE INVENTION

This invention relates generally to a high productivity water well completion system, and particularly to a completion system where a production pipe or liner that extends horizontally through an aquifer is used in combination with an existing vertical well to greatly enhance the rate at which water can be produced from or recharge such aquifer.

BACKGROUND OF THE INVENTION

High production flow rate water wells are needed, for example, in agricultural irrigation or for commercial, industrial or municipal utility purposes. In these cases, water production in excess of 250,000 gallons per day peak may be required. Substantial production rate enhancement can be achieved by a horizontal completion as disclosed in U.S. Pat. Nos. 5,289,888, 5,343,965 and 5,396,950, which are incorporated herein by express reference. As viewed from above, production through an elongated horizontal liner changes the sectional configuration of the drawdown volume of the aquifer from basically circular for a vertical well completion to an elongated rectangle for a horizontal completion, the rectangle having a length dimension approximately equal to that of the production liner.

It can be demonstrated that a horizontal completion will result in a water production rate enhancement, in a 40 foot thick unconfined aquifer, by a factor of about 2 when using a 100 ft. long production liner, up to about 7.6 when using a liner that is 400 ft. long. Such enhancements are attained using the same drawdown pressure, and of course the drawdown can be reduced by such factors while producing at the same rate from a horizontally completed well compared to a vertically completed one. For example, whereas a vertical well into such aquifer might be capable of producing water at a rate of 150 gallons per minute, a horizontal well in the same aquifer with a 200 ft. long production liner is capable of producing 570 gallons per minute.

Many thousands of vertical wells have been completed for example in the Ogallala aquifer which accounts for about 30% of the natural supply of ground water that is used for agricultural irrigation in the United States. Each well produces a cone of depression in the water table which limits productivity. Moreover, the saturated water thickness of this aquifer has been declining for many decades due to insufficient natural recharge. The only solution to the problem of reduced water production in the past has been to drill and complete more and more vertical wells which involves such large outlays in completion costs that this solution may no longer be economically feasible. The present invention is directed to a unique water well system where an existing vertical well and pump are used in combination with a horizontal production liner that passes closely thereto to achieve greatly enhanced water production rates from an aquifer with an overall savings in completion costs.

A general object of the present invention is to provide a new and improved water well completion system that enables high production rates.

Another object of the present invention is to provide an new and improved water well completion system that greatly enhances production rate by changing the configuration of the drawdown area of an existing vertical well extending into an aquifer from circular to elongated rectangular.

Still another object of the present invention is to provide a new and improved water well completion system where a production liner is positioned horizontally in the aquifer so that its longitudinal axis passes close by the axis of an existing vertical well from which water is being pumped to greatly enhance production rate of the system.

SUMMARY OF THE INVENTION

These and other objects are attained in accordance with the concepts of the present invention through the provision of a water well completion system and method where an elongated production liner is positioned horizontally in an aquifer along a path whose axis passes closely adjacent to the axis of the production liner of an existing vertical well bore having a pump installed therein by which water is brought to the surface. Preferably the near pass distance of the two boreholes should not exceed about 5% of the effective drainage radius of the vertical well to ensure maximum enhancement in water production rate. The drawdown pressure or pressure gradient created by operation of the pump causes most of the water being pumped to migrate toward and enter the horizontal production liner, which has essentially no resistance to water flow, and then toward the vertical well bore. In the near pass region, the water flows out of this liner and into the interior of the vertical well bore where it is lifted by the pump to the surface under pressure. The horizontal production liner can be positioned in the aquifer as disclosed in one or more of the above mentioned patents, or by various directional drilling techniques that have been used to inject pipes under obstacles such as road right-of-ways or rivers. Various directional drilling techniques can be employed downhole which use drilling motors. Once the horizontal production liner is in place, its bore is plugged beyond the inner end of its slotted or perforated length. The enhancement in water production rate is dramatic as noted above, and the well system is very cost effective when compared to the total cost of drilling a number of additional vertical wells to obtain equivalent enhancement.

BRIEF DESCRIPTION OF THE DRAWINGS

The present invention has the above as well as other objects, features and advantages which will become more clearly apparent in connection with the following detailed description of a preferred embodiment, taken in conjunction with the appended drawings in which.

DETAILED DESCRIPTION OF A PREFERRED EMBODIMENT

Figure 1:
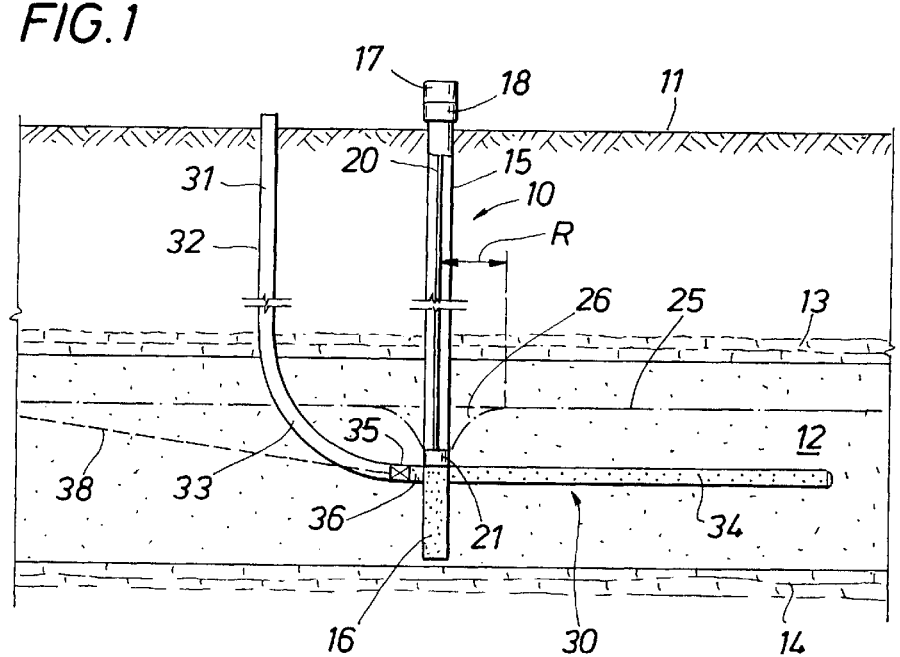
FIG. 1 is a schematic side sectional view through an underground aquifer having a well system of the present invention installed to pump water therefrom.

Referring initially to FIG. 1, a vertical water well 10 extends downward from the ground surface 11 into an aquifer 12 that can have a thickness, for example, of about 40 feet. Typically the aquifer 12 is an unconsolidated layer of sand and gravel having good porosity and high permeability, and with impermeable strata of shale 13, 14 respectively above and below it. Although most good aquifers are sands, some aquifers are limestone with solution enlarged passageways. The top of the aquifer 12 in many instances will be found about 300 ft. below the surface 11. The well 10 typically is lined with a casing 15 which has a production screen or liner 16 as its lowermost section which is located well down into the aquifer 12. One way to pump water out of the well 10 is to mount a motor 17 on a casing head 18 at the surface 11 which drives an elongated shaft 20. The lower end of the shaft 20 is connected to pump 21 which is set in the liner 16 and which suctions water coming in through the openings in the screen 16 into the casing 15 where it is forced to flow upward and through a surface outlet 22 under pressure. Alternatively the well 10 can be produced by a submersible electric pump, or other type of high capacity device. Line 25 represents the top of the saturated thickness of the sand 12 (water table), and the surface 26 represents a roughly conical volume of sand that contains much air because most all the water has been removed therefrom by pumping in the normal course of operation. The surface 26 can also be used to designate a cone of depression. It will be recognized that as viewed from above, the general shape of a horizontal section through the drawdown area in the saturated thickness of the aquifer 12 is a circle having a diameter whose radius is the effective drainage radius Re.

In accordance with the present invention, a horizontal, or near horizontal, well 30 is employed in combination with the vertical well bore 10 to greatly enhance the water production rate. As disclosed in U.S. Pat. Nos. 5,289,888 and 5,396,950, the well 30 can have an upper section 31 drilled on the vertical and then lined with a casing 32, a bend section 33 having its outer end whose axis is directed substantially horizontally, and an elongated production section or liner 34 that is suitably screened or perforated to admit water while keeping-out sand and gravel. The production section 34 is suitably plugged at its outer end. The vertical section 31 and the section 33 are arranged with respect to the existing well 10 such that the inner end portion 36 of the production liner 34 extends somewhat beyond the vertical well 10 as shown, and very closely thereto. A bridge plug 35 preferably is set in the production section 34 close to the beginning of the water flow slots or openings.

Figure 2:
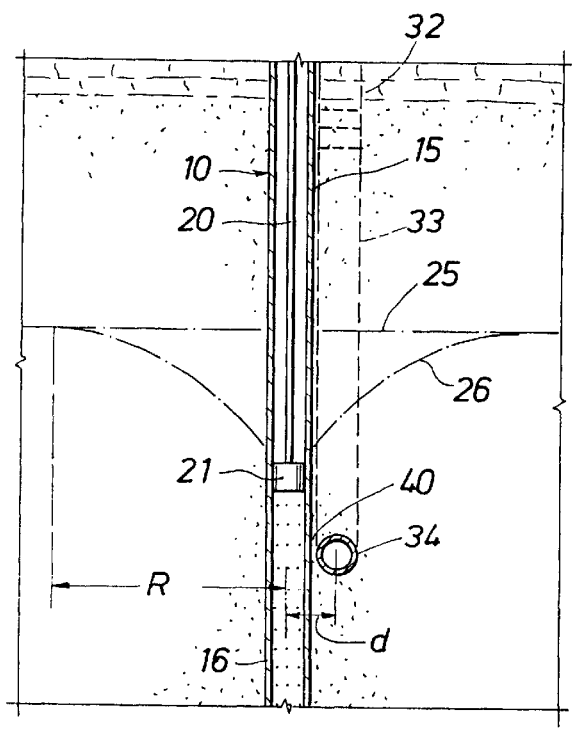
FIG. 2 is a view similar to FIG. 1 but at a right angle thereto.

With reference to FIG. 2, the distance d between the respective axis 36, 37 of the two sections 16, 34 should be no more than about 2 feet for optimum results. The production rate enhancement E for a horizontal versus a vertical well completion can be shown to be $$E = \frac{4L}{1.5Re} \quad \text{(Eq. 1)}$$

where L=length of the horizontal production liner
Re=effective drainage radius of a vertical well.

The factor Re is a function of certain aquifer parameters such as hydraulic conductivity, specific yield and thickness. For a typical aquifer, K=60 gal./day/ft$^2$ and S=0.15. For an unconfined aquifer having a thickness of 40 ft., the production rate enhancement that is obtained for various lengths of horizontal production liner 34 is as follows:

| L | E |
|---|---|
| 100' | 1.9 |
| 150' | 2.9 |
| 200' | 3.8 |
| 300' | 5.7 |
| 400' | 7.6 |

Figure 3:
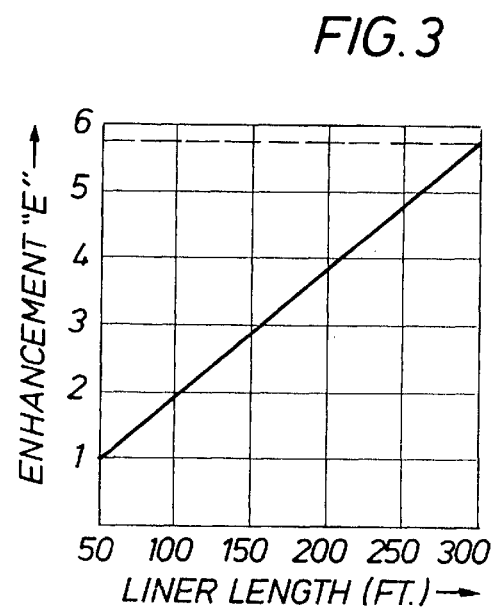
FIG. 3 is a graph of production rate enhancement that is attained through use of the present invention.

Thus in a situation where a vertical well penetrates a 40 ft. thick aquifer and has a peak production rate of 150 gal./min., a horizontal production liner 34 having a length of 200 ft. in the same aquifer will produce 570 gal./min. FIG. 3 is a graphic representation of such enhancement for various lengths of production liners 34, assuming the above parameters. Not only is water production rate enhanced employing the same drawdown, the drawdown can be reduced substantially when producing at the same production rate as a vertical well.

OPERATION

To greatly enhance the water production capability of an existing vertical well 10 which has been drilled, completed, and put on production by the pump 21, the horizontal well 30 is formed in association therewith and as disclosed herein. For a relatively shallow well installation the horizontal section 34 of the production pipe can be installed in the position shown using well known procedures for placing pipe under obstacles such as road right-of-ways and rivers. The entry point of the drill head will be considerably further away as indicated by the phantom line 38 in FIG. 1 so that the angle of the entry borehole is about 15° above horizontal. The drill head is steered to begin drilling substantially horizontal a fairly short distance before it reaches the near vicinity of the vertical well 10. Close directional control over the drill's heading is maintained so that the borehole passes within a few feet, or even closer, of the well 10. Considerably deeper horizontal wells can be drilled with oil field directional drilling technology and tools including a downhole motor and a bent sub. Automatic telemetry of directional signals to the surface including inclination angle and azimuth enables a very close approach of the horizontal section 34 to the vertical hole 10. Perhaps the most economical method of forming the horizontal well installation 30 is in accordance with the disclosure of U.S. Pat. No. 5,343,965 when a flexible 90° arc of pipe is forced through the vertical part of the borehole and then washed or jetted into place to provide the transition to horizontal. Then a flexible but normally straight production section having a selected length is forced around the bend and washed into the aquifer along the horizontal. Single shot surveys can be made as the bend pipe is being washed in to ensure that the horizontal production section, when installed, will pass closely by the production liner 16 of the vertical well 10. Once the outer or lower end of the bent section 33 is plugged with a suitable bridge-type packer, the pump 21 in the vertical well 10 can be started up to achieve an enhanced water production rate. That part of the well installation 30 from the plug 35 on up becomes expendable and can be pulled for use elsewhere.

Not only will the present invention enhance water production rate, its use also will enhance artificial recharge of an aquifer by pumping water from another source or reservoir into it to raise the water table.

The drawdown pressure caused by operation of the pump 21 will be extended laterally for the full reach of the horizontal well bore to achieve the enhanced rate of production. A significant flow of water out of the inner section 36 of the production liner 34 and into the screen 16 of the vertical well 10 will exist at the region 40 of closest approach of these two sections, which as stated above should be as short as practically possible, particularly since the pressure drawdown of the vertical well 10 decreases logarithmically radially outward from that well.

Other advantages of the well system disclosed herein are that the existing pump installation need not be disturbed unless a higher capacity pump may be needed, and that the pump is operated vertically where that orientation will increase bearing life and the like. It will be readily appreciated that the cost of forming the horizontal well 30 will be only a fraction of the cost of drilling and completing a large number of additional vertical wells that would be required to achieve the equivalent enhanced flow rate of the present invention.

It now will be recognized that a new and improved water well installation has been disclosed which enables greatly enhanced production rates to be achieved. Since certain changes and modifications may be made in the disclosed embodiment without departing from the inventive concepts involved, it is the aim of the appended claims to cover all such changes and modifications falling within the true spirit and scope of the present invention.

What is claimed is:

1. A method of enhancing the production of water from a substantially vertical well that extends from the surface down into an underground aquifer, comprising the steps of: forming a substantially horizontal well of substantial length along a path that passes close to said vertical well; and pumping water from said vertical well which is drawn from the aquifer primarily via said horizontal well.

2. The method of claim 1 wherein said horizontal well has an outer end remote from said vertical well and an inner end adjacent thereto.

3. The method of claim 2 where said horizontal well includes portions that extend upward to the surface, and including the further step of closing off said upper portions at a location adjacent said inner end of said horizontal well.

4. A well system for enhancing the rate at which water is produced from an aquifer, comprising: a vertical well extending from the surface into said aquifer and having a pump installed therein; and a horizontal well completion including a water production section that extends longitudinally within said aquifer, said production section having a portion passing close to said vertical well and supplying water thereto which has been drawn into said horizontal section by operation of said pump.

5. The system of claim 4 wherein the closest distance between said horizontal portion and said vertical well is not more than about 5% of the drainage radius of said vertical well.

* * * * *